(12) United States Patent
Bertz et al.

(10) Patent No.: US 9,241,285 B1
(45) Date of Patent: Jan. 19, 2016

(54) PCRF/ANDSF INTERACTION IN A COMMUNICATION NETWORK

(75) Inventors: Lyle T. Bertz, Lee's Summit, MO (US); Daniel Joe Sershen, Overland Park, KS (US); Charles Brent Hirschman, Overland Park, KS (US); Arun Rajagopal, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 301 days.

(21) Appl. No.: 13/572,210

(22) Filed: Aug. 10, 2012

(51) Int. Cl.
*H04L 1/00* (2006.01)
*H04W 28/12* (2009.01)
*H04L 29/06* (2006.01)
*H04L 29/08* (2006.01)

(52) U.S. Cl.
CPC ........... *H04W 28/12* (2013.01); *H04L 65/1033* (2013.01); *H04L 67/288* (2013.01)

(58) Field of Classification Search
CPC . H04W 28/02; H04W 28/0289; H04W 28/12; H04W 28/16; H04W 76/022; H04W 28/0268; H04L 45/123; H04L 45/308; H04L 45/38
USPC ......................................................... 370/254
See application file for complete search history.

(56) References Cited

U.S. PATENT DOCUMENTS

| | | | |
|---|---|---|---|
| 8,285,291 B2 | 10/2012 | Dinan et al. | |
| 2009/0305684 A1 | 12/2009 | Jones et al. | |
| 2010/0208698 A1* | 8/2010 | Lu et al. | 370/331 |
| 2010/0296415 A1* | 11/2010 | Sachs et al. | 370/254 |
| 2011/0044253 A1* | 2/2011 | Zisimopoulos | 370/328 |
| 2011/0067085 A1 | 3/2011 | Brouard et al. | |
| 2011/0090794 A1* | 4/2011 | Cherian et al. | 370/235 |
| 2011/0110300 A1 | 5/2011 | Sachs et al. | |
| 2011/0225306 A1 | 9/2011 | Delsesto et al. | |
| 2011/0317571 A1* | 12/2011 | Kokkinen et al. | 370/252 |
| 2012/0257598 A1 | 10/2012 | Karampatsis et al. | |
| 2012/0324100 A1* | 12/2012 | Tomici et al. | 709/224 |
| 2013/0028193 A1* | 1/2013 | Rommer et al. | 370/328 |
| 2013/0064221 A1* | 3/2013 | Pampu et al. | 370/331 |
| 2013/0142042 A1* | 6/2013 | Garcia Martin | H04L 12/5692 370/230 |
| 2013/0265986 A1* | 10/2013 | Pampu et al. | 370/331 |
| 2013/0322300 A1* | 12/2013 | Landais | H04L 45/302 370/259 |
| 2013/0322365 A1* | 12/2013 | Garcia Martin | H04L 41/0893 370/329 |
| 2014/0022904 A1* | 1/2014 | Ahmad et al. | 370/235 |
| 2014/0036873 A1* | 2/2014 | Cheng et al. | 370/331 |

FOREIGN PATENT DOCUMENTS

| | | |
|---|---|---|
| EP | 2449822 | 1/2011 |
| WO | 2011002370 | 1/2011 |

\* cited by examiner

*Primary Examiner* — Derrick Ferris
*Assistant Examiner* — Joe Combs (57) ABSTRACT

In a packet communication system, a PCRF processes communication policy data to generate a communication policy instruction and a user notice. The PCRF transfers the communication policy instruction for delivery to a packet gateway system. The PCRF transfers the user notice for delivery to an ANDSF. The ANDSF processes the user notice to generate and transfer a data file for delivery to a user communication device that displays the user notice based on the data file. The packet gateway system processes the communication policy instruction to filter packets exchanged with the user communication device.

16 Claims, 7 Drawing Sheets

PCRF/ANDSF INTERACTION IN A COMMUNICATION NETWORK

TECHNICAL BACKGROUND

User communication devices reach the Internet over access networks, such as Long Term Evolution (LTE) networks. The Third Generation Partnership Project (3GPP) describes an Evolved Packet Core (EPC) that uses an LTE network to provide mobile Internet access to user communication devices. The 3GPPP EPC includes a Policy, Charging, and Rules Function (PCRF). The PCRF provides communication policies to various network elements to implement on packet communications for the user communication devices. The 3GPPP EPC also includes an Access Network Discovery and Selection Function (ANDSF). The ANDSF provides network selection assistance to the user communication devices.

Unfortunately, the PCRF and the ANDSF do not effectively interact. The network selection activities of the ANDSF are kept largely isolated from the communication policy activities of the PCRF. In addition, the PCRF does not have suitable access to the user communication devices, and the ANDSF does not effectively enforce communication policies or provide coordinated event notification.

TECHNICAL OVERVIEW

In a packet communication system, a PCRF processes communication policy data to generate a communication policy instruction and a user notice. The PCRF transfers the user notice for delivery to the ANDSF. The PCRF transfers the communication policy instruction for delivery to a packet gateway system. The ANDSF processes the user notice to generate and transfer a data file for delivery to a user communication device that displays the user notice based on the data file. The packet gateway system processes the communication policy instruction to filter packets exchanged with the user communication device.

DETAILED DESCRIPTION

Figure 1:
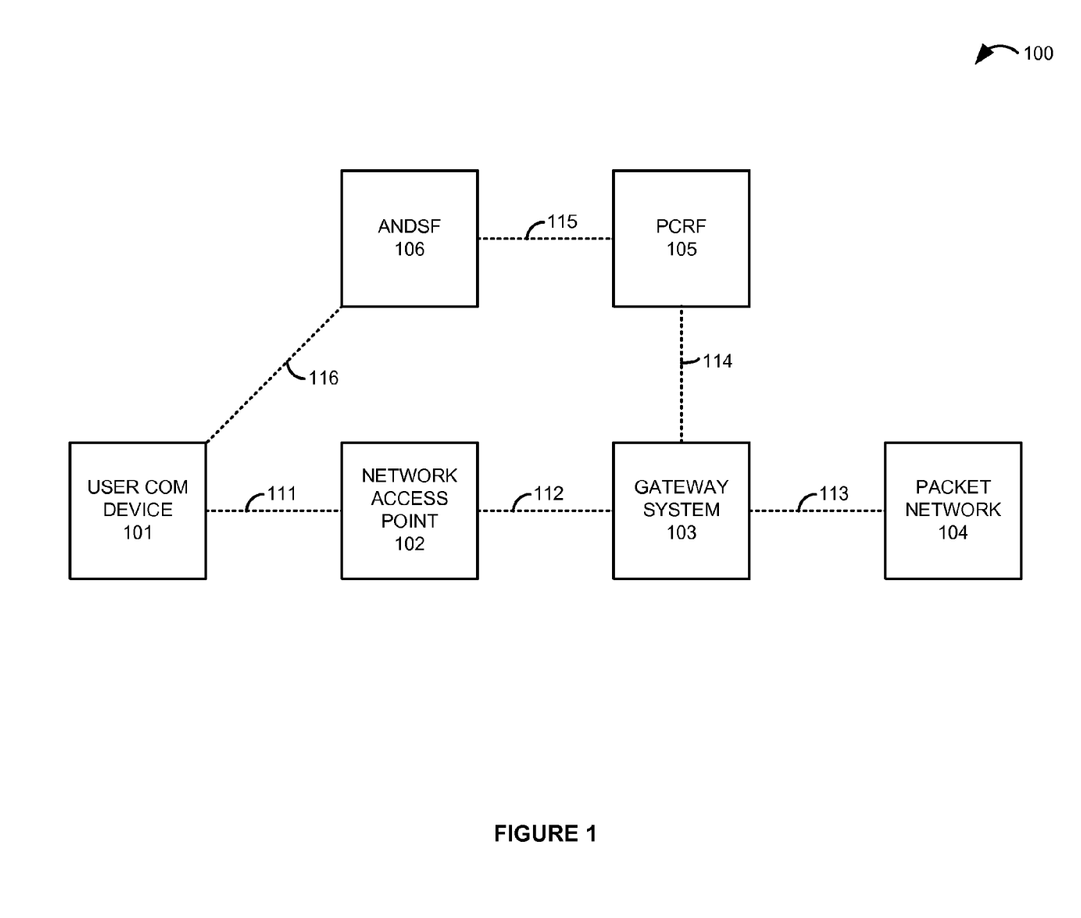
FIG. 1 illustrates a communication system having PCRF/ANDSF interaction.

FIG. 1 illustrates communication system 100 having PCRF/ANDSF interaction. Communication system 100 comprises user communication device 101, network access point 102, gateway system 103, packet network 104, PCRF 105, and ANDSF 106. PCRF 105 processes communication policy data to generate a communication policy instruction and a user notice related to the communication policy instruction. PCRF 105 transfers the communication policy instruction to packet gateway system 103. PCRF 105 transfers the user notice to ANDSF 106.

ANDSF 106 receives the user notice from PCRF 105. ANDSF 106 processes the user notice to generate a data file indicating the user notice. ANDSF 106 transfers the data file to user communication device 101. Based on the data file, user communication device 101 displays the user notice for the communication policy instruction.

Packet gateway system 103 exchanges communication packets with user communication device 101—and typically with packet network 104. Based on the communication policy instruction, packet gateway system 103 filters at least some of these communication packets. Filtering might include bandwidth control, quality-of-service management, deep packet inspection, accounting, and/or some other type of packet processing.

In some examples, PCRF 105 processes the communication policy data to generate configuration data for user communication device 101. The configuration data is often related to the communication policy instruction and is used by user communication device 101 to control device operation. A few examples of configuration data include video adaption instructions and connectivity testing procedures. PCRF 105 transfers the configuration data to ANDSF 106, and ANDSF 106 processes the configuration data to generate the data file that is delivered to user communication device 101. User communication device 101 modifies its own configuration based on the data file. For example, user communication device 101 might use its modified configuration to receive video in a network format and then adapt the video internally for display on device 101. In other examples, user communication device 101 might use the modified configuration to perform pre-handover connectivity tests under certain network conditions.

In some examples, PCRF 105 is configured with various processing triggers that direct system operations. One of these triggers directs PCRF 105 to transfer the user notice to ANDSF 105 for delivery to user communication device 101. Another one of these PCRF triggers might direct PCRF 105 to transfer the configuration data to ANDSF 106 for delivery to user communication device 101. These PCRF triggers represent an example of the communication policy data referenced above.

In some examples, PCRF 105 transfers an event trigger to ANDSF 106 to direct ANDSF monitoring and reporting operations. ANDSF 106 receives and processes the event trigger to detect and report a triggering event. One example of a triggering event might be a status change for user communication device 101 that is determined by ANDSF 106, such as new applications that are installed on device 101. Another example of a triggering event might be information transferred from user communication device 101 to ANDSF system, such as user requests for connectivity or service information. In response to detecting the triggering event, ANDSF 106 transfers an event notice to PCRF 105. PCRF 105 may process the event notice to transfer a communication policy instruction, user notice, and/or device configuration data. These ANDSF event notices also represent examples of the communication policy data referenced above.

User communication device 101 comprises a phone, computer, media player, machine transceiver, or some other communication transceiver. Network access point 102 comprises a wireless base station, network access server, or some other network element. Gateway system 103 comprises computer and communication platforms that provide a multi-network interface. Packet network 104 comprises routers, servers, computers, and the like. PCRF 105 and ANDSF 106 comprise computer and communication systems.

User communication device 101 and network access point 102 communicate over link 111. Network access point 102 and gateway system 103 communicate over link 112. Gateway system 103 and packet network 104 communicate over link 113. Gateway system 103 and PCRF 105 communicate over link 114. PCRF 105 and ANDSF 106 communicate over link 115. ANDSF 106 and user communication device 101 communicate over link 116. Note that links 111-116 may traverse other links and systems. For example, link 116, may utilize network access point 102 and link 111. Link 115 may utilize link 114 and gateway system 103.

Links 111-116 use communication protocols, such as Long Term Evolution (LTE), Wireless Fidelity (WiFi), Global System for Mobile Communications (GSM), Evolution Data Only (EVDO), High Speed Packet Access (HSPA), Bluetooth, Data Over Cable Service Interface Specification (DOCSYS), T1, Ethernet, Internet Protocol (IP), or some other communication protocols—including combinations thereof. Links 111-116 might be wireless, optical, metallic, or some other communication media—including combinations thereof. Links 111-116 may individually comprise multiple parallel connections that utilize different protocols and paths. Links 111-116 may also include various intermediate networks, systems, and devices.

Figure 2:
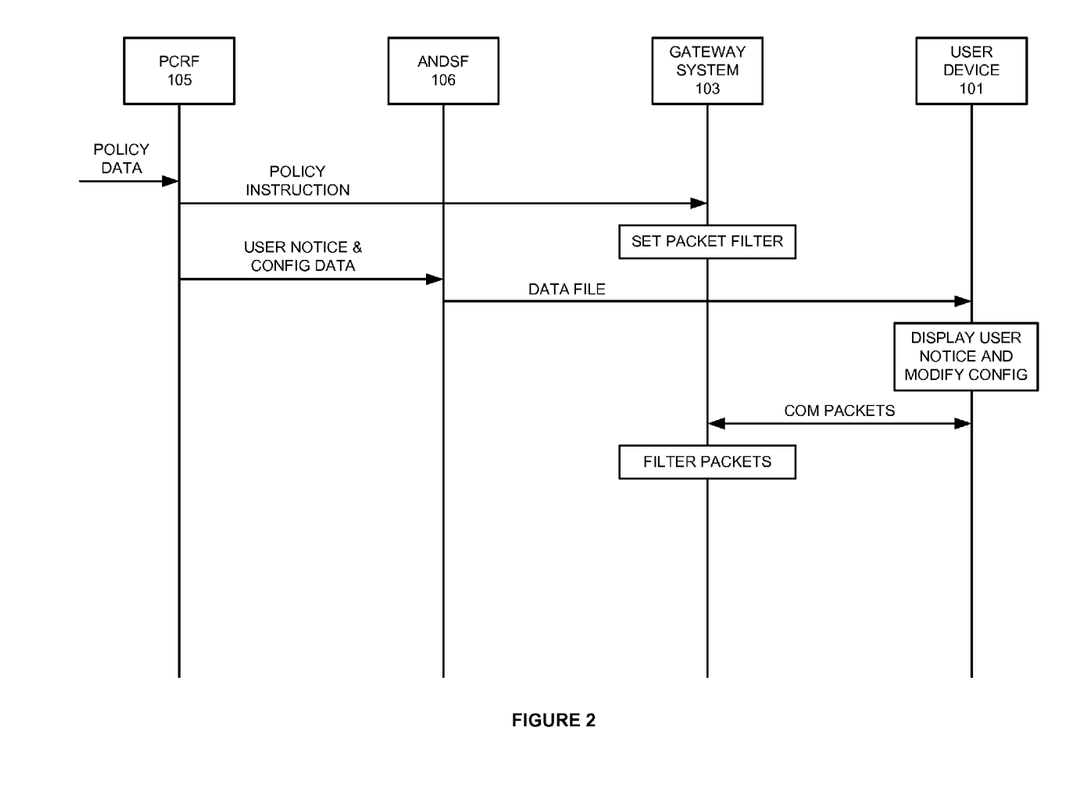
FIG. 2 illustrates the operation of a communication system to implement PCRF/ANDSF interaction.

FIG. 2 illustrates the operation of communication system 100 to implement PCRF/ANDSF interaction. PCRF 105 receives and processes communication policy data to generate a communication policy instruction, a user notice related to the communication policy instruction, and device configuration data related to the communication policy instruction. For example, a provisioning system may transfer policy data to PCRF 105 for an LTE/video promotion for user communication device 101. PCRF 105 processes this policy data to generate and transfer the policy instruction to gateway system 103. In the LTE/video example, the policy instruction might be to discount fees for all video packets that are delivered to user communication device 101 by a new LTE access network. Gateway system 103 processes the policy instruction to set a packet filter, such as a filter to discount LTE/video packets transferred to device 101.

PCRF 105 also processes the policy data to generate and transfer a user notice and device configuration data to ANDSF 106 for delivery to user communication device 101. ANDSF 106 processes the user notice and configuration data to generate a data file. ANDSF 106 transfers the data file to user communication device 101. Based on the data file, user communication device 101 displays the user notice for the communication policy instruction and modifies the device configuration. For example, the user notice might invite the user to enjoy discounted video from the new LTE access network. The configuration data might direct device 101 to access the LTE network and decompress received video packets for display on device 101.

Packet gateway system 103 exchanges communication packets with user communication device 101. In the LTE/video example, some of these packets are video packets delivered to device 101 by the new LTE network. Based on the communication policy instruction, packet gateway system 103 filters these communication packets to apply the discount to the LTE/video packets.

Figure 3:
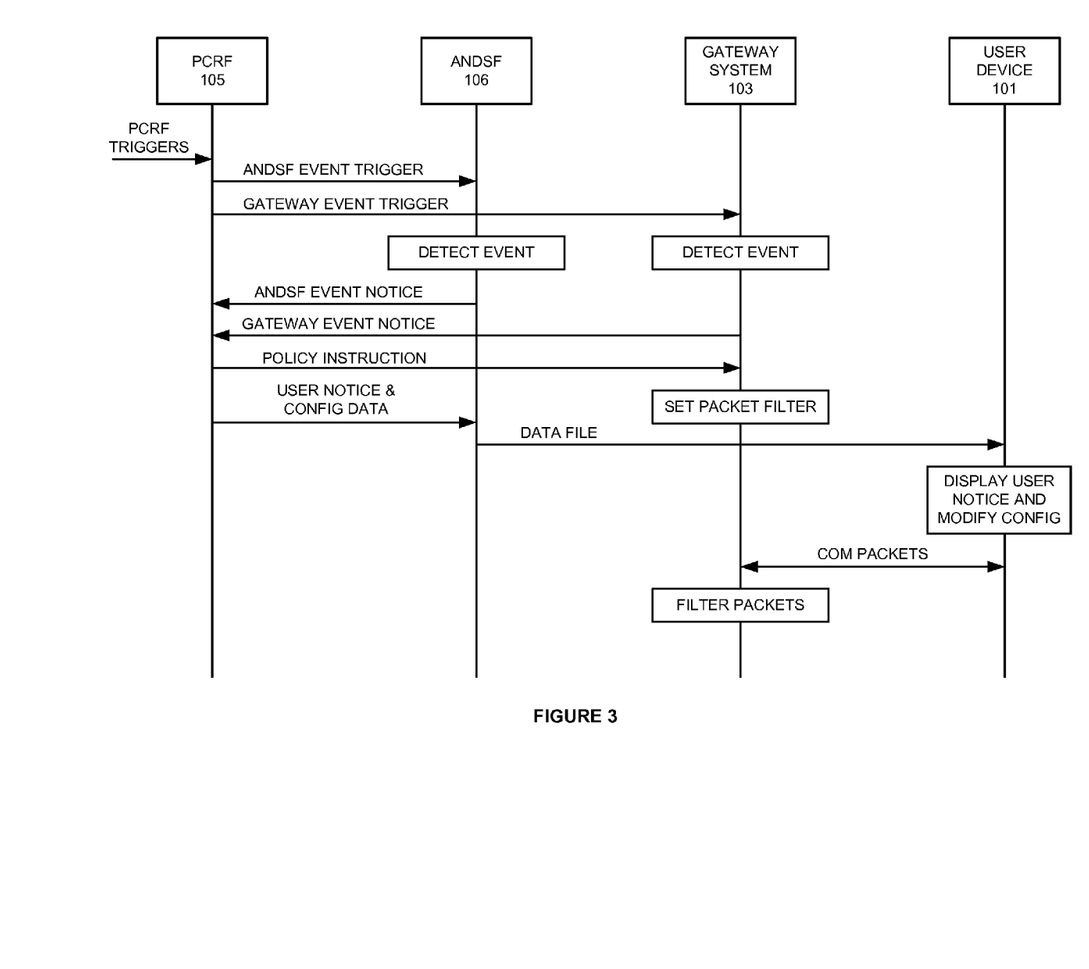
FIG. 3 illustrates the operation of a communication system to implement PCRF/ANDSF interaction using various triggers.

FIG. 3 illustrates the operation of communication system 100 to implement PCRF/ANDSF interaction using various triggers. PCRF 105 receives and processes PCRF triggers to generate an ANDSF event trigger and a gateway event trigger. PCRF 105 transfers the ANDSF event trigger to ANDSF 106 and transfers the gateway event trigger to gateway system 103. For example, the ANDSF event trigger might be to detect and report when a particular access network is identified to device 101 for selection. The gateway trigger might be to detect quality-of-service violations associated with the particular access network.

ANDSF 106 detects its triggering event and reports the triggering event to PCRF 105 in an ANDSF event notice. Gateway system 103 detects its triggering event and reports the triggering event to PCRF 105 in a gateway event notice. PCRF 105 processes the event notices to generate and transfer a policy instruction to gateway system 103. PCRF 105 also processes the event notices to generate and transfer a user notice and device configuration data to ANDSF 106 for delivery to user communication device 101. For example, PCRF 105 might transfer a user notice for device 101 that indicates that connectivity testing will be performed before using the particular access network. The configuration data would direct user device 101 to perform connectivity testing, such as Interactive Connectivity Establishment (ICE) testing or the like, before handing-over to the particular network.

ANDSF 106 processes the user notice and configuration data to generate a data file. ANDSF 106 transfers the data file to user communication device 101. Based on the data file, user communication device 101 displays the user notice and modifies the device configuration. For example, user device 101 may display a testing notice to the user, and then initiate connectivity testing before using the particular network. The connectivity testing typically entails an exchange of pings, files, and the like.

Gateway system 103 receives the policy instruction and sets a filter for the policy. For example, a lower quality-of-service level may now be implemented for user device 101 when using the particular network (and after successful connectivity testing by user device 101). Gateway system 103 exchanges communication packets with user communication device 101. Based on the communication policy instruction, packet gateway system 103 filters the communication packets.

Figure 4:
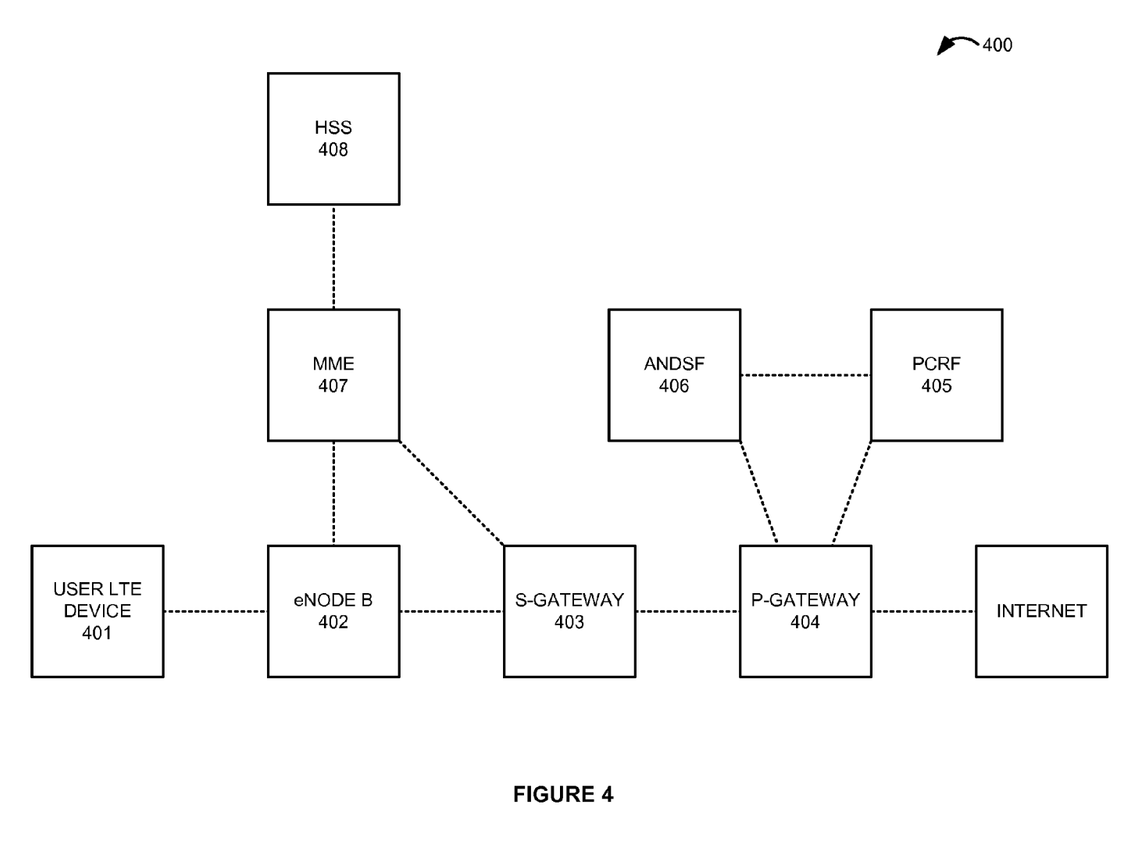
FIG. 4 illustrates a communication system having PCRF/ANDSF interaction in a 3GPP EPC environment.

FIG. 4 illustrates communication system 400 having PCRF/ANDSF interaction in a 3GPP Evolved Packet Core (EPC) environment. Communication system 400 comprises user LTE device 401, eNodeB 402, Serving Gateway (S-GW) 403, Packet Network Gateway (P-GW) 404, PCRF 405, ANDSF 406, Mobility Management Entity (MME) 407, and Home Subscriber Server (HSS) 408. P-GW 404 is linked to the Internet.

PCRF 405 receives triggers and other policy data from a provisioning system or application function. PCRF 405 processes the triggers and policy data to develop communication policies for various users and their communication devices, including user LTE device 401. PCRF 405 may push communication policies to S-GW 403 and P-GW 404, or S-GW 403 and P-GW 404 may pull the communication policies from PCRF 405. Note that P-GW 404 may provide the policies to S-GW 403 instead of PCRF 405. S-GW 403 and P-GW 404 exchange packets between user LTE device 401 and the Internet using eNodeB 402. S-GW 403 and P-GW 404 implements the communication policies for user LTE device 401 on these packet exchanges. In particular, P-GW 404 applies packet filters for user LTE device 401 to implement quality-of-service controls, perform rating and charging, adapt and process video, and the like. PCRF 405 processes the triggers and policy data to generate and transfer event triggers for S-GW 403 and P-GW 404.

PCRF 405 also processes the triggers and policy data to develop user notices and device configurations related to the communication policies for various users and their communication devices, including user LTE device 401. In addition, PCRF 405 processes the triggers and policy data to generate and transfer event triggers for ANDSF 406. PCRF 405 transfers this information to ANDSF 406 for delivery to the appropriate user communication devices.

ANDSF 406 and user LTE device 401 communicate through eNodeB 402, S-GW 403, and P-GW 404—although other paths could be used. ANDSF 406 transfers XML data files to user LTE device 401 to assist in network discovery and selection. ANDSF 406 also transfers XML data files to user LTE device 401 based on information provided by PCRF 405, such as user notices and device configuration instructions. ANDSF 406 performs the XML transfers through a push—typically a message with a link back to ANDSF 406. User devices may also pull the XML files from ANDSF 406—possibly in response to user instructions.

User LTE device 401 processes the received XML data to select access networks and to perform other tasks as directed by PCRF 406 and/or the user. In device configuration scenarios, the user notice from the XML data typically includes a user approval collection graphics module to receive user approval before any new device configuration is implemented.

Consider an exemplary situation where policy data and triggers are loaded into PCRF 405 to offer free video to user LTE device 401 over communication system 400 if the user will configure their device with a new video decoder. PCRF 405 transfers a user notice and configuration link to ANDSF 406 which forwards the user notice and configuration link to user LTE device 401 in an XML file. User LTE device 401 displays a user notice offering the free video and video configuration, and if the user selects the approval module on the display, then user LTE device 401 launches the link to download and install the video decoder over the Internet. Responsive to the XML and the user approval, user LTE device 401 notifies ANDSF 406 of the user approval and possibly the decoder download.

ANDSF 406 triggers on the information from user LTE device 401 indicating the user approval. ANDSF transfers an event notice back to PCRF 405 indicating the user approval. Responsive to the event notice (and possibly a request from P-GW 405), PCRF 405 transfers video policies to P-GW 404 for user LTE device 401 directing P-GW 404 to implement the applicable video coding to deliver the video over S-GW 403 and eNodeB 402. The video policies also direct P-GW 404 to remove any charges for the video transfer.

When the user downloads the video over communication system 400, P-GW 404 codes the video for delivery over S-GW 403 and eNodeB 402. User LTE device receives, decodes, and displays the video. P-GW 404 also marks the usage records as "no charge" for the video transfer.

Note that other types of access networks, such as WiFi, CDMA, GSM, and the like could also be used in the manner described above for LTE.

Figure 5:
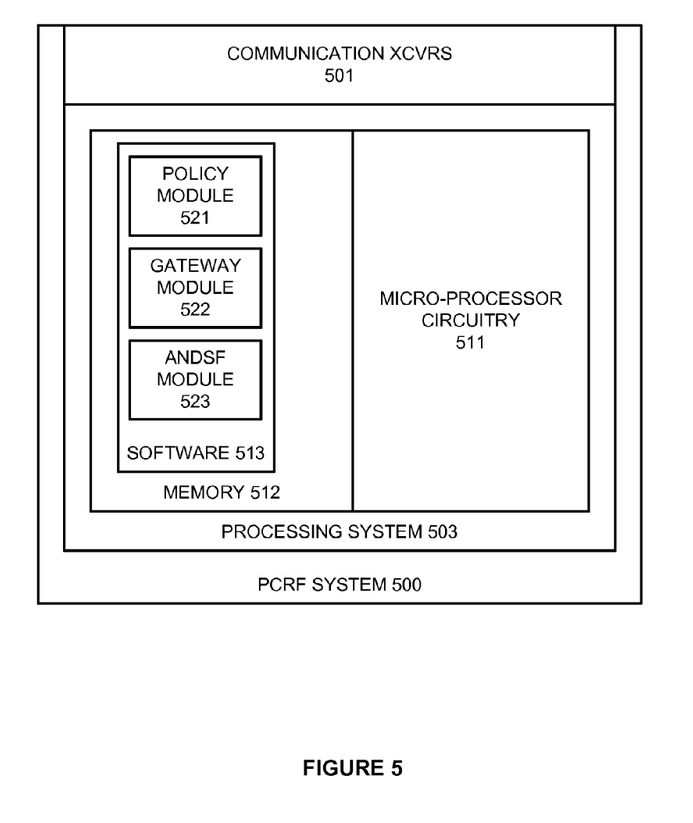
FIG. 5 illustrates a PCRF system that implements PCRF/ANDSF interaction.

FIG. 5 illustrates PCRF system 500 that implements PCRF/ANDSF interaction. PCRF 500 is an example of the PCRF 105 and 405, although these systems may use alternative configurations and operations. PCRF system 500 comprises communication transceivers 501 and processing system 503. Processing system 503 comprises micro-processing circuitry 511 and memory 512. Memory 512 stores software 513. PCRF system 500 may be integrated into a single platform or may be distributed across multiple diverse computer and communication systems. Some conventional aspects of PCRF system 500 are omitted for clarity, such as power supplies, enclosures, and the like.

Communication transceivers 501 comprise communication components, such as ports, circuitry, memory, software, and the like. Communication transceivers 501 typically utilize Ethernet, Internet, or some other networking protocol suitable for PCRF communications—including combinations thereof.

Micro-processor circuitry 511 comprises circuit boards that hold integrated circuitry and associated electronics. Memory 512 comprises non-transitory, computer-readable, data storage media, such as flash drives, disc drives, and the like. Software 513 comprises computer-readable instructions that control the operation of micro-processor circuitry 511 when executed. Software 513 includes modules 521-523 and may also include operating systems, applications, utilities, databases, and the like. Micro-processor circuitry 511 and memory 512 may be integrated into a single computer system or may be distributed across multiple computer systems.

When executed by circuitry 511, policy module 521 directs circuitry 511 to interact with provisioning systems and process triggers to select communication policies, user notices, and device configurations as described herein. When executed by circuitry 511, gateway module 522 directs circuitry 511 to exchange policy data and event triggers with various gateways. When executed by circuitry 511, ANDSF module 523 directs circuitry 511 to transfer user notices, device configurations, and event triggers to an ANDSF system as described herein.

Figure 6:
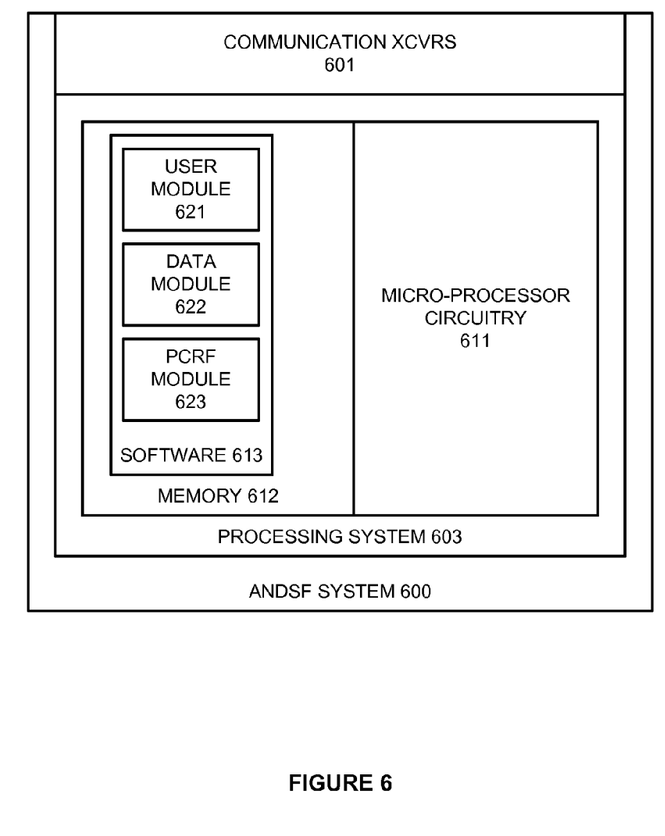
FIG. 6 illustrates an ANDSF system that implements PCRF/ANDSF interaction.

FIG. 6 illustrates ANDSF system 600 that implements PCRF/ANDSF interaction. ANDSF 600 is an example of ANDSF 106 and 406, although these systems may use alternative configurations and operations. ANDSF system 600 comprises communication transceivers 601 and processing system 603. Processing system 603 comprises micro-processing circuitry 611 and memory 612. Memory 612 stores software 613. ANDSF system 600 may be integrated into a single platform or may be distributed across multiple diverse computer and communication systems. Some conventional aspects of ANDSF system 600 are omitted for clarity, such as power supplies, enclosures, and the like.

Communication transceivers 601 comprise communication components, such as ports, circuitry, memory, software, and the like. Communication transceivers 601 typically utilize Ethernet, Internet, or some other networking protocol suitable for communication with user devices—including combinations thereof.

Micro-processor circuitry 611 comprises circuit boards that hold integrated circuitry and associated electronics. Memory 612 comprises non-transitory, computer-readable, data storage media, such as flash drives, disc drives, and the like. Software 613 comprises computer-readable instructions that control the operation of micro-processor circuitry 611 when executed. Software 613 includes modules 621-623 and may also include operating systems, applications, utilities, databases, and the like. Micro-processor circuitry 611 and memory 612 may be integrated into a single computer system or may be distributed across multiple computer systems.

When executed by circuitry 611, user module 621 directs circuitry 611 to interact with user communication devices as described herein. When executed by circuitry 611, data module 622 directs circuitry 611 to translate information from a PCRF system into data files suitable for the user communication devices. When executed by circuitry 611, PCRF module 623 directs circuitry 611 to receive user notices, device configurations, and event triggers from a PCRF system as described herein.

Figure 7:
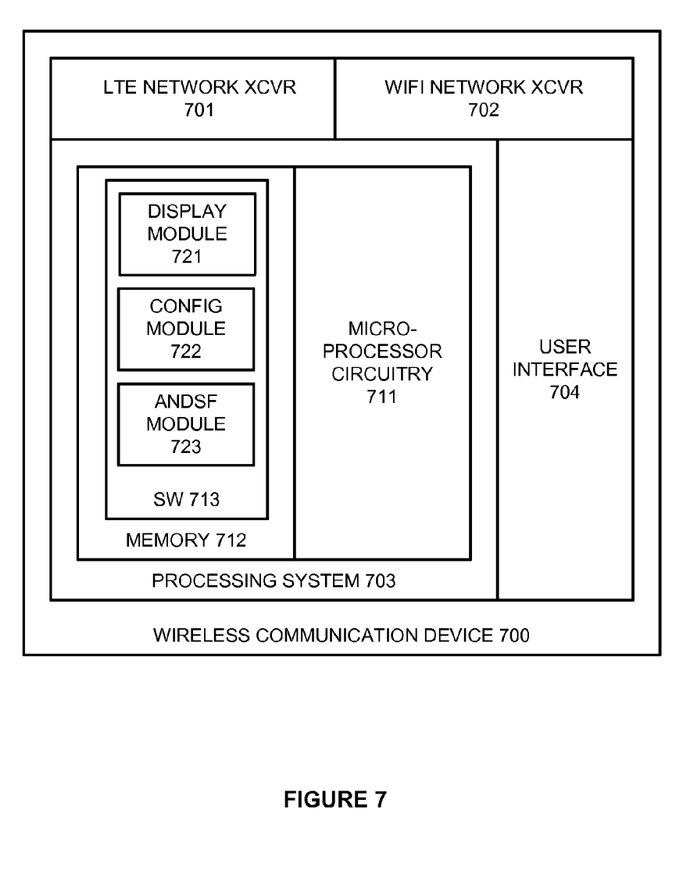
FIG. 7 illustrates a wireless communication device that operates responsive to PCRF/ANDSF interaction.

FIG. 7 illustrates wireless communication device 700 that operates responsive to PCRF/ANDSF interaction. Wireless communication device 700 is an example of user communication devices 101 and 401 although devices 101 and 401 may use alternative configurations and operations. Wireless communication device 700 comprises LTE network transceiver 701, WiFi network transceiver 702, processing system 703, and user interface 704. Processing system 703 comprises micro-processing circuitry 711 and memory 712. Memory 712 stores software 713. Some conventional aspects of wireless communication device 700 are omitted for clarity, such as power supplies, enclosures, and the like. Wireless communication device 700 may be integrated into other systems or devices.

LTE network transceiver 701 and WiFi transceiver 702 each comprise communication components, such as circuitry, memory, software, antennas, amplifiers, filters, modulators, signal processors, and the like. In some examples, the radio communications include multiple transceiver sub-systems for near-field, local network, and wide-area network data communications. LTE network transceiver 701 receives data files from an ANDSF system as described herein.

User interface 704 includes components to interact with a human operator, such as a touch display, speaker, microphone, camera, buttons, and switches. User interface 704 displays user notices for communication policies and may collect user approvals and instructions as described herein.

Micro-processor circuitry 711 comprises one or more circuit boards that hold integrated circuit chips and associated electronics. Memory 712 comprises non-transitory data storage media, such as flash drives, disc drives, and the like. Software 713 comprises computer-readable instructions that control the operation of micro-processor circuitry 711 when executed. Software 713 includes modules 721-723 and may also include additional operating systems, applications, utilities, databases, and the like.

When executed by circuitry 711, display module 721 directs circuitry 711 to display the user notices and collect user approvals as described herein. When executed by circuitry 711, configuration module 722 direct circuitry 711 to modify device configurations responsive to ANDSF data files and/or user instructions. When executed by circuitry 711, ANDSF module 723 directs circuitry 711 to receive or retrieve data files from an ANDSF system.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a packet communication system having an Access Network Discovery Selection Function (ANDSF) system, a Policy and Charging Rules Function (PCRF) system, and a packet gateway system, the method comprising:
   in the PCRF system, processing communication policy data to generate a communication policy instruction, a user notice related to the communication policy instruction, and configuration data related to the communication policy instruction for a user communication device;
   in the PCRF system, transferring the user notice and the configuration data for delivery to the ANDSF system and transferring the communication policy instruction for delivery to the packet gateway system;
   in the ANDSF system, receiving and processing the user notice and the configuration data to generate and transfer a data file indicating the user notice and the configuration data for delivery to the user communication device, wherein the ANDSF transfers the data file including the user notice and the configuration data to the user communication device;
   in the user communication device, the user communication device displays the user notice related to the communication policy instruction based on the data file and modifies a device configuration based on the configuration data in the data file; and
   in the packet gateway system, receiving and processing the communication policy instruction to filter packets exchanged with the user communication device based on the communication policy instruction.

2. The method of claim 1 wherein processing the communication policy data to generate and transfer the user notice and the configuration data to the ANDSF system comprises processing a PCRF trigger to generate and transfer the user notice and configuration data to the ANDSF system for delivery to the user communication device.

3. The method of claim 1 further comprising:
   in the PCRF system, transferring an event trigger for delivery to the ANDSF system;
   in the ANDSF system, receiving and processing the event trigger to detect a triggering event;
   in the ANDSF system, transferring an event notice for delivery to the PCRF system responsive to detecting the triggering event; and
   in the PCRF system, receiving the event notice indicating the triggering event.

4. The method of claim 3 wherein the event trigger comprises a status change for the user communication device determined by the ANDSF system.

5. The method of claim 3 wherein the event trigger comprises information transferred from the user communication device to the ANDSF system.

6. The method of claim 3 wherein processing the communication policy data to generate and transfer the communication policy instruction, the user notice, and the configuration data comprises processing the event notice from the ANDSF system.

7. The method of claim 1 wherein the device configuration comprises a video adaptation configuration.

8. The method of claim 1 wherein the device configuration comprises a pre-handover connectivity test configuration.

9. A packet communication system comprising:
   a Policy and Charging Rules Function (PCRF) system configured to process communication policy data to generate a communication policy instruction, a user notice related to the communication policy instruction, and configuration data related to the communication policy instruction for a user communication device,
   the PCRF system is configured to transfer the user notice and the configuration data for delivery to an Access Network Discovery Selection Function (ANDSF) system, and transfer the communication policy instruction for delivery to a packet gateway system;
   the ANDSF system is configured to receive and process the user notice and the configuration data to generate and transfer a data file indicating the user notice and the configuration data for delivery to the user communication device, wherein the ANDSF transfers the data file including the user notice and the configuration data to the user communication device;

the user communication device displays the user notice related to the communication policy instruction based on the data file and modifies a device configuration based on the configuration data in the data file; and the packet gateway system is configured to receive and process the communication policy instruction to filter packets exchanged with the user communication device based on the communication policy instruction.

10. The packet communication system of claim 9 wherein the PCRF system is configured to process a PCRF trigger to generate and transfer the user notice and the configuration data to the ANDSF system for delivery to the user communication device.

11. The packet communication system of claim 9 wherein:

the PCRF system is configured to transfer an event trigger for delivery to the ANDSF system;

the ANDSF system is configured to receive and process the event trigger to detect a triggering event and transfer an event notice for delivery to the PCRF system responsive to detecting the triggering event; and the PCRF system is configured to receive the event notice indicating the triggering event.

12. The packet communication system of claim 11 wherein the event trigger comprises a status change for the user communication device and the ANDSF system is configured to detect the status change for the user communication device.

13. The packet communication system of claim 11 wherein the event trigger comprises information transferred from the user communication device to the ANDSF system and the ANDSF system is configured to receive the information transferred from the user communication device.

14. The packet communication system of claim 11 wherein the communication policy data processed by the PCRF system to generate and transfer the communication policy instruction, the user notice, and the configuration ndata comprises the event notice from the ANDSF system.

15. The packet communication system of claim 9 wherein the device configuration comprises a video adaptation configuration.

16. The packet communication system of claim 9 wherein the device configuration comprises a pre-handover connectivity test configuration.

* * * * *